United States Patent Office 2,989,396
Patented June 20, 1961

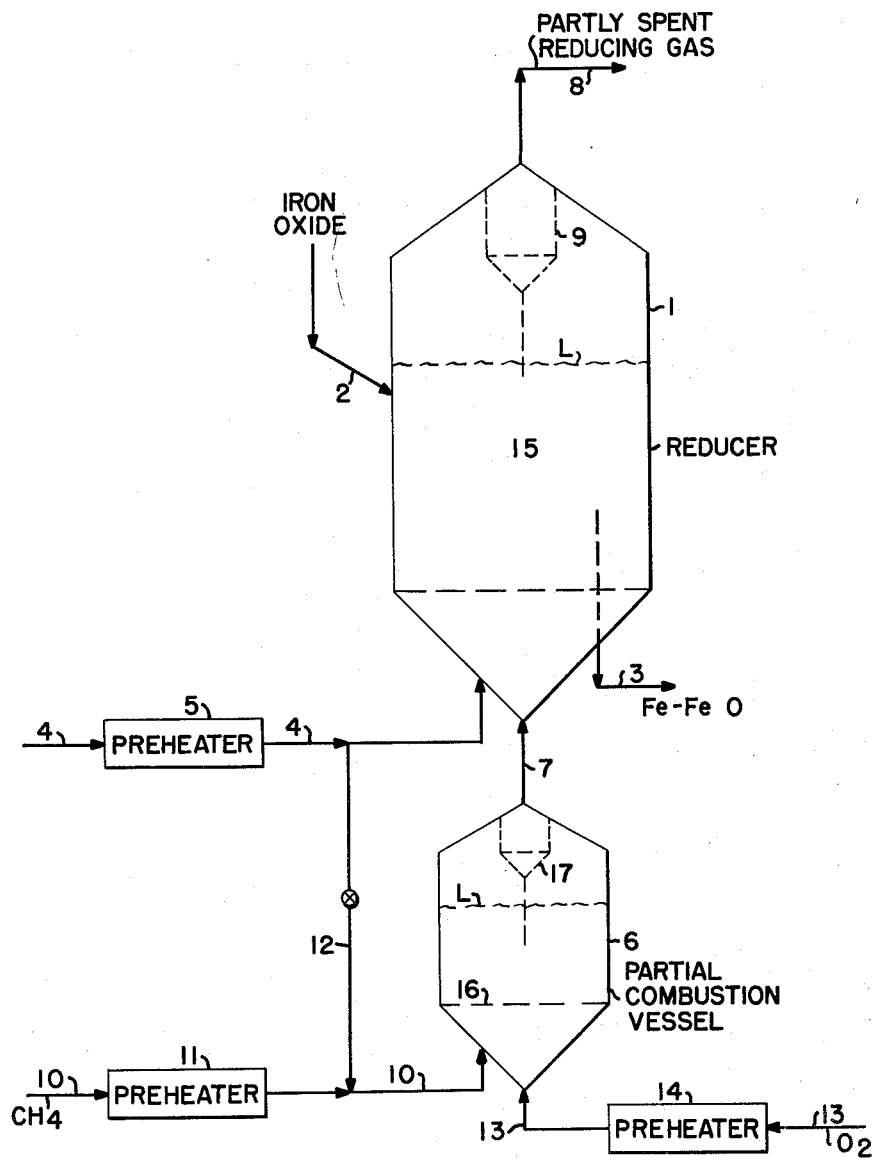

2,989,396
DIRECT REDUCTION OF IRON OXIDE BY HYDROCARBON
Warren K. Lewis, Newton, Mass., assignor to Esso Research and Engineering Company, a corporation of Delaware
Filed Nov. 3, 1958, Ser. No. 771,306
11 Claims. (Cl. 75—26)

This invention relates to a process for direct reduction of iron oxide using hot hydrocarbons mixed with higher temperature partly oxidized hydrocarbon products that are formed in a fluidized solids combustion zone.

This invention is concerned with an improvement of the process described in U.S. Patent 2,711,368 of W. K. Lewis. The process described involves contacting a fluidized mixture of Fe and FeO having a controlled proportion of Fe with a mixture of a hydrocarbon gas and partial combustion products of the hydrocarbon gas. The partial combustion products are formed by supplying a combustion-supporting gas, oxygen or air, to the hydrocarbon gas which is fed in excess to the reduction zone.

In the type of operation shown in the patent mentioned, difficulties can arise in making satisfactory utilization of the hydrocarbon for direct reduction of the iron oxide. This reaction is believed to involve cracking of the hydrocarbon which depends on catalytic action of reduced iron surfaces. Hence, it is believed that formation of reduction-resistant oxide scale on the iron particles might be caused by localized traces of oxidizing substances, e.g., $O_2$, $CO_2$, and $H_2O$, and thus effect a decline in the rate of decomposition of the hydrocarbon. If the rate declines, the bed depth of the Fe-FeO mixture has to be increased to obtain a desired degree of reduction, but increase of bed depth is expensive, adverse for suitable pressure drop and solids holdup time.

It now develops that a better utilization of hydrocarbon in the direct reduction is obtainable in accordance with the present invention by separately forming high temperature reducing gas products of partial oxidation from a portion of the hydrocarbon material used in a properly controlled combustion zone for subsequent admixing with another portion of the hydrocarbon material supplied to the metal oxide reducing zone instead of adding the oxidizing gas to all the hydrocarbon material being passed to the reducing zone. In order to obtain the high temperature partial combustion products with suitable control of composition and homogeneity, the portion of the hydrocarbon material to be subjected to partial combustion is mixed with a high temperature oxidizing gas in a combustion chamber, wherein mixing takes place in the presence of fluidized refractory solids. The fluidized solids provide a large amount of hot surface contact area for accomplishing desired good mixing and substantially complete conversion of the oxidizing gas to CO and $H_2$. The fluidized solids can be selected to resist melting or agglomeration at very high temperatures, e.g., above 1000° C.

In a preferred embodiment, fluidized solid particles of a refractory material are heated to high temperatures, e.g., in the range of 1000° to 1500° C., which are above the iron oxide reduction temperatures, in a combustion chamber fed with a controlled amount of hydrocarbon and preheated air to effect partial combustion of the hydrocarbon. The hydrocarbon and air are proportioned to generate a gas containing carbon monoxide, hydrogen, and nitrogen, with negligble amounts of $CO_2$ and $H_2O$. The use of the fluidized solids combustion chamber permits preheating of the air or combustion-supporting gas to as high a temperature as is practicable with available refractory materials, e.g., to temperatures of 1000° to 1500° C., or higher. Thus, the partial oxidation gases are formed with controlled composition, desired homogeneity by good mixing; also, with a sufficiently high temperature favoring the formation of CO and $H_2$ and for maintaining the reduction temperature between 800° and 1000° C. needed in the iron oxide reducing zone to which is supplied additional hydrocarbon material for the direct reduction treatment.

As in the process that U.S. Patent 2,711,368 describes, the iron oxide ore may be reduced in stages. The starting ore, e.g., hematite, may be preheated in an initial stage by hot gases from the burning of spent reducing gas of a following stage where $Fe_2O_3$ is reduced to FeO. The reduction of $Fe_2O_3$ to FeO is readily carried out using partially spent reducing gases from a subsequent stage where FeO is reduced to Fe. It is the latter reduction stage which is sensitive to the composition of the reducing gas.

A preferred mode of operation will be described with reference to the drawing that illustrates schematically apparatus means in a flow plan for conducting the process of this invention.

In the drawing, the reduction zone where FeO particles from a preliminary reduction of $Fe_2O_3$ are mixed with Fe particles in a fluidized bed is represented as contained in reducer vessel 1. The FeO particles are charged from feed line 2 into the fluidized Fe-FeO mixture which is to be maintained at a desired temperature in the range of 800° to 1000° C., preferably 850° to 950° C. The FeO, as it is charged to vessel 1, may be at an elevated temperature, e.g., in the range of 700 to 900° C. and it is added in controlled amounts to maintain in the fluidized mixture 5 to 30 weight percent FeO with 70 to 95 weight percent Fe. When part of the fluidized solids mixture subjected to reduction is withdrawn through line 3 more FeO is added to maintain the above mentioned proportion. Addition of FeO and withdrawal of the Fe-FeO mixture may be carried out continuously or intermittently.

A hot reducing gas mixture that functions as a fluidizing and heating agent in the reducer vessel is made up of gaseous hydrocarbon that is preferably preheated and mixed with still hotter gaseous oxidation products formed from hydrocarbon or carbonaceous material in a combustion chamber. The gaseous hydrocarbon may be fed directly through line 4 into vessel 1 from a preheater 5 for mixing in the bottom part of vessel 1 with partial oxidation products entering vessel 1 from the partial combustion chamber 6 through line 7. These gases may also be premixed, if desired, before entering vessel 1. The mixing of these gases is controlled to have a suitable temperature, pressure, flow rate and reducing capacity.

Spent reducing gas that is disengaged from the fluidized Fe-FeO mixture in vessel 1 contains a high proportion of CO to $CO_2$ and hydrogen to $H_2O$, depending on conditions which make the reducing gas close to equilibrium with the FeO and Fe. These partly spent reducing gases may be passed by line 8 to a preliminary reduction zone for reduction of $Fe_2O_3$ to FeO. Entrained solids may be separated from this gas in the cyclone separator 9. Combustion chamber 6 is equipped to contain fluidized refractory solids in which partial combustion of hydrocarbon material is effected. Hydrocarbon material is supplied to chamber 6 from a feed line 10 through a preheater 11. If the same kind of hydrocarbon is to be supplied to the combustion chamber 6 as is supplied through line 4 to the reduction zone, a common preheater may be used for the hydrocarbon material, as, for example, through the split feed line 12.

Combustion-supporting gas, e.g., air, oxygen, or mixtures of such gases, is supplied from line 13 through preheater 14 to the combustion chamber 6. As previously mentioned, the air or combustion-supporting gas is preferably heated to as high a temperature as practical with available devices so that the temperature given to the partial combustion products formed in combustion chamber 6 will be well above the temperatures needed for the reduction in vessel 1. Since there is a limitation on the amount of preheat that can be put into the hydrocarbon material with respect to its carbonization or coke depositing properties, it is possible to add more heat by raising the temperature of the preheated air or oxidizing gas.

In the combustion chamber 6 the fluidized refractory solid particles are made to form a fluidized bed 15 above a grid 16 with an upper level L. These solids should be of suitable size for proper fluidization without excessive entrainment, e.g., 10 to 150 mesh size. Suitable fluidized refractory materials for use in chamber 6 include coke, sand, alumina, alumina silicates, fire brick, magnesia, etc. From the combustion chamber 6 the hot partial combustion gas products are withdrawn through a cyclone 17 or equivalent device for removing entrained solids. These hot gases may then be sent directly by line 7 to the iron oxide reducing vessel 1.

The hydrocarbon material supplied through line 4 for mixing with the partial combustion gaseous products and hydrocarbon material supplied to the combustion chamber 6 may be the same but need not be the same. For example, where methane, natural gas, refinery gas, or the like, is economical to use, such hydrocarbons may be used both for obtaining the direct reduction and for obtaining the high temperature partial oxidation gas in the fluidized solids partial combustion chamber 6. The low molecular weight gaseous hydrocarbons can be preheated to fairly high temperatures without excessive coking, for example, in the range of 300° to 800° C. If petroleum oil distillates are more economical for use, they can be used in place of the normally gaseous hydrocarbons or together with them, e.g., naphtha, kerosene fractions, or even heavier petroleum oils. It is even possible to use heavier residual oils or pulverized solid carbonaceous materials, particularly atomized in the combustion chamber with advantages to be gained from the high heat value of fuels having high carbon to hydrogen ratios. However, in using any of the carbonaceous materials, light, heavy, or both, in the process, care must be taken not to use a material which will not introduce too much sulfur into the FeO reducing zone. Various known devices may be used for atomizing any carbonaceous material of low volatility.

In the reducer 1, the solid particles of Fe and FeO of principally about 10 to 150 mesh size (about 0.1 to 2.0 millimeter diameter) form the fluidized bed 15 above the grid 16 with an upper level L when the hot reducing gas mixture is passed upwardly through the bed at a velocity in the range of 0.5 to 5.0 feet per second, i.e., using well recognized fluidization conditions.

The apparatus used should be constructed of suitable heat and pressure resistant materials, e.g., steel shells with refractory linings, insulation, etc.

The iron oxide particles charged to the vessel 1 preferably should be FeO but some minor amount of higher oxide, $Fe_2O_3$, may be present. The higher oxide is rapidly reduced to FeO in the reduction zone.

It has been found that as the amount of Fe present with the FeO is increased, the decomposition of the hydrocarbon and the FeO reduction rates are increased, while at the same time there is an increased formation of CO and $H_2$ provided oxidizing gases ($CO_2$, $H_2O$ and $O_2$) are prevented from entering with the reducing gas as much as possible. A point is reached as the FeO content of the Fe-FeO mixture becomes extremely low, below 5 weight percent, when carbon deposition from the hydrocarbon becomes rapid and the reduction rate falls off rapidly. Although the reduction rate begins to increase even when the Fe to FeO mixture contains nearly 100% FeO, it is preferred to take advantage of the increased rate from the increased proportion of Fe present; accordingly, a suitable Fe-FeO mixture to be established contains about 5 to 30 weight percent FeO with 95 to 70 weight percent Fe.

The following example demonstrates requirements for satisfactory treatment of a FeO-Fe mixture contacted with a hot gaseous mixture made up by mixing preheated hydrocarbon gas rich in methane with a higher temperature mixture of CO, $H_2$, and $N_2$ formed by partial combustion or partial oxidation of methane-rich hydrocarbon gas in a fluidized bed of refractory solid particles.

*Example*

Hematite containing 55 weight percent Fe in the form of $Fe_2O_3$ of 60 to 140 mesh size is reduced to FeO at a temperature in the range of 700° to 950° C. by contact with partially spent reducing gas containing 2 moles of CO per mole of $CO_2$ and 2 moles $H_2$ per mole of $H_2O$ in a pretreatment.

A stable fluidized mixture of Fe and FeO is formed by admixing the hot FeO obtained in the pretreatment with fluidized Fe particles from reduction of FeO in a hot reducing gas mixture ot be described. The FeO is admixed to give the Fe-FeO mixture and 80 weight percent content of Fe. The temperature of the fluidized Fe-FeO mixture is maintained at 870° C. by the hot reducing gas mixture which fluidizes the solid particles, the gas velocity being 1 foot per second for a bed length to diameter ratio of 2:1.

To prepare the hot reducing gas mixture about 60% of the hydrocarbon gas rich in methane to be used is passed from a preheating fixed coil at 700° C. to a mixing zone, while the other 40% of the hydrocarbon gas is sent into a fluidized bed of refractory particles to undergo partial combustion with air preheated to 1200° C. The preheated air is supplied at a rate to have ½ mole of oxygen react per mole of $CH_4$ so as to produce CO and $H_2$ with negligible amounts of $CO_2$ and $H_2O$ at a temperature of about 1300° C. The resulting hot partial combustion gas which includes nitrogen and a little unreacted hydrocarbon is passed to said mixing zone for mixing with the other portion (60%) of the preheated hydrocarbon gas to form the reducing gas mixture having a temperature of about 1100° C. which is then passed into the fluidized bed of Fe-FeO.

The temperatures and proportions of hydrocarbon gas passed to the partial combustion zone can be varied, but it is advantageous to limit the amount of hydrocarbon gas sent to the partial combustion zone so that an excessive amount of hydrocarbon is not decomposed to carbon therein. In the preheating of the hydrocarbon the temperature can be adjusted to prevent too much carbonization. Steps can be taken to remove coke deposits from a preheater coil while the hydrocarbon is passed through another preheater coil that has been cleaned.

The operation described is adapted for the use of petroleum hydrocarbon distillates which can be preheated and volatilized or gasified at temperatures up to 800° C. without excessive carbonization, as, for example, naphtha, kerosene, and gas oils; but as the oils become higher boiling, lower preheat temperatures have to be used, e.g., 400° to 500° C. for kerosene. Such hydrocarbons can be used with the split feed method described for gaseous methane. However, heavier hydrocarbons or carbonaceous materials may be substituted in part or total as fuel for the partial combustion, e.g., heavy residual oils, powdered coal, or powdered coke. In using the heavier carbonaceous materials, they have to be selected to be low in sulfur content as steps have to be taken to remove sulfur from the gaseous products of the combustion, e.g., treatment of the hot gases with solid calcium oxide or copper on alumina in a fixed or fluidized bed.

While most of the studies of the system described have been made with relatively low pressures of one to a few atmospheres, higher pressures can be used to the extent that they do not cause excessive entrainment of solid particles.

In general, well known fluidizing conditions, as to flow rates, particle size distribution, bed depths, and pressures are applicable in the operation of the partial combustion and reducer vessels. In the adiabatic reducer system, the size of the apparatus can be increased for greater capacity, but larger heat input is needed from the partial combustion vessel to maintain the required FeO reduction temperatures in the range of 800° to 1000° C. At the same time, it is desirable to make maximum use of the direct reduction by the gaseous hydrocarbon with the presence of a minimum of oxidizing gases in the reducing gas mixture, the term "gaseous hydrocarbon" embracing normally gaseous hydrocarbons and volatilized liquid hydrocarbons. For obtaining this object it has been shown that it is highly advantageous to have the portion of gaseous hydrocarbons that is to effect the direct reduction preheated in a zone separately from the partial combustion zone where much higher temperature (CO and $H_2$)-containing gas is formed and then mix said preheated gaseous hydrocarbon with the higher temperature partial combustion gas product so as to form the hot reducing gas mixture sent into the fluidized Fe-FeO bed.

By operating in the manner described, the hydrocarbon can be made the major reducing component compared to the other reducing components, CO and $H_2$, on a molar basis, with a very low content of $H_2O$, $CO_2$ and unreacted $O_2$, e.g., less than 1 weight percent, present in the hot reducing gas mixture. Furthermore, any such small amount of oxidizing gas present in extremely small minimum amount is certain to be in negligible concentration in part of the gas mixture on account of the thorough mixing effected.

The invention described is claimed as follows:

1. A process for reducing ferrous oxide particles which consists in partially oxidizing hydrocarbon material with oxidizing gas in a mass of hot fluidized refractory solid particles to produce a hot gaseous product containing carbon monoxide and hydrogen with a minimum of carbon dioxide and water at a temperature above that necessary for reducing ferrous oxide, admixing gaseous hydrocarbon with said hot gaseous product as it is produced from the partially oxidized hydrocarbon material to form a hot reducing gas mixture above the temperature necessary for reducing ferrous oxide, passing said hot reducing gas mixture at said temperature into contact with a fluidized mixture of ferrous oxide and metallic iron particles to reduce said ferrous oxide to iron.

2. A process for reducing iron oxide which consists in heating a gaseous hydrocarbon to a temperature in the range of about 300° to 800° C., partially oxidizing said gaseous hydrocarbon in a partial combustion zone with air heated to a temperature above 1000° C. in the presence of fluidized refractory solid particles to form a partial combustion gaseous product in which substantially all the oxygen of the air is converted to CO and $H_2$, admixing gaseous hydrocarbon at a temperature below 800° C. with said partial combustion gaseous product as it leaves the partial combustion zone at a temperature above 1000° C. to form a reducing gas mixture having a temperature above the temperature necessary for reducing the iron oxide and passing the reducing gas mixture into a reducing zone containing iron oxide fluidized with iron particles whereby the iron oxide particles are reduced to iron.

3. A process of reducing FeO particles in a fluidized solids mixture with Fe particles by a reducing gas, which consists in thoroughly mixing methane with oxygen-containing gas proportioned to react ½ mole of oxygen with one mole of methane in a partial combustion zone wherein a large amount of hot solid surface area is contacted in forming a hot gaseous mixture of CO with $H_2$ containing a minimum of $H_2O$, $CO_2$, and unreacted $O_2$, admixing with said hot gaseous mixture of CO and $H_2$ thus formed additional $CH_4$ gas to form the reducing gas for reducing the FeO, then passing the resulting gas mixture of $CH_4$, CO and $H_2$ into contact with a fluidized solids mixture of FeO and Fe particles at a reduction temperature in the range of 800° to 1000° C.

4. A process for reducing ferrous oxide in a reducing zone in the range of 800° to 1000° C. which consists in partially oxidizing hydrocarbon material thoroughly mixed in a mass of fluidized refractory solid particles with oxidizing gas to produce a hot gaseous product containing CO and $H_2$ with a minimum of $CO_2$ and $H_2O$ in a partial combustion zone at a temperature above said reduction temperature, admixing with said hot gaseous product gaseous hydrocarbon preheated to a lower temperature to form a reducing gas mixture of CO, $H_2$, and gaseous hydrocarbon that is heated to a temperature above said reduction temperature by heat of the hot gas product formed in the partial combustion zone, and contacting the ferrous oxide in the reduction zone with the thus heated reducing gas mixture thereby supplying heat to maintain the ferrous oxide at said reduction temperature.

5. In the process of claim 1, said reducing gas mixture being formed by admixing enough of the gaseous hydrocarbon to make the gaseous hydrocarbon the predominant reducing component in mole ratio to CO and $H_2$ contained in the reducing gas mixture passed into contact with the fluidized mixture of ferrous oxide and metallic iron particles.

6. In the process of claim 1, methane being the gaseous hydrocarbon which is preheated then admixed with the higher temperature hot gaseous product from the partially oxidized hydrocarbon material.

7. In the process of claim 1, said oxidizing gas used for partially oxidizing the hydrocarbon material in the mass of fluidized refractory solid particles being preheated above 1000° C., and resulting gaseous product from the partially oxidized hyrdocarbon material having a temperature above 1000° C. when the lower temperature gaseous hydrocarbon is admixed.

8. In the process of claim 2, said hydrocarbon preheated in the preheating zone and partially oxidized in the partial combustion zone being methane, the methane being in major molar proportion to CO and to $H_2$ present in the reducing gas mixture.

9. In the process of claim 2, in which kerosene vapors are preheated in the preheating zone.

10. In a process for reducing ferrous oxide mixed with metallic iron particles in a solids mass maintained fluidized and heated by a reducing gas mixture to a reduction temperature of 800° to 1000° C. in a reduction zone, the improvement which comprises passing a preheated gaseous hydrocarbon stream into a mixing zone, passing another stream of hydrocarbon material into a partial combustion zone, thoroughly mixing hydrocarbon material passed into said combustion zone with an oxygen-containing gas stream supplied thereto with sufficient heat to generate a gas containing CO and $H_2$ with a minimum of $CO_2$ and $H_2O$ at a temperature above 1000° C., passing a stream of said gas generated in the combustion zone at above 1000° C. to said mixing zone to form therein with said preheated gaseous hydrocarbon stream a reducing gas mixture having a temperature above 1000° C. and containing hydrocarbon admixed from said preheated gaseous hydrocarbon stream as a major reducing component and passing the reducing gas mixture at above 1000° C. into said solids mass in said reduction zone at sufficient rate to prevent substantial decomposition of the hydrocarbon component with carbon deposition before contact with said solids mass.

11. A process of reducing FeO particles mixed with Fe particles by a reducing gas mixture of hydrocarbon CO and $H_2$ which supplies heat to said particles, which consists in producing a hot gas mixture of CO and $H_2$ having a temperature in the range of about 1000 to 1500° C. by partial combustion of hydrocarbon material with thoroughly admixed oxygen-containing gas in contact with refractory solid particles fluidized in a partial combustion zone, passing said hot gas mixture kept at above 1000° C. from the partial combustion zone directly to a mixing zone, separating solid particles from said hot gas mixture as it is thus passed to said mixing zone, admixing lower temperature gaseous hydrocarbon with the hot gas mixture passed to said mixing zone to form the reducing gas mixture of hydrocarbon with CO and $H_2$ having a temperature raised to above 950° C. by heat carried in the hot gaseous mixture from the partial combustion, and passing the thus formed reducing gas mixture into reducing zone containing the FeO particles mixed with Fe particles maintained at a temperature at which the FeO particles are reduced and heated by the reducing gas mixture.

References Cited in the file of this patent

UNITED STATES PATENTS

| | | |
|---|---|---|
| 2,540,593 | Ogorzaly | Feb. 6, 1951 |
| 2,547,685 | Brassert | Apr. 13, 1951 |
| 2,577,730 | Benedict | Dec. 11, 1951 |
| 2,837,419 | Sellers | June 3, 1958 |